United States Patent [19]
McQueen

[11] 3,935,911
[45] Feb. 3, 1976

[54] EARTH BORING BIT WITH MEANS FOR CONDUCTING HEAT FROM THE BIT'S BEARINGS

[75] Inventor: Robert William McQueen, Houston, Tex.

[73] Assignee: Dresser Industries, Inc., Dallas, Tex.

[22] Filed: June 28, 1974

[21] Appl. No.: 484,049

[52] U.S. Cl. ............... 175/17; 175/228; 175/331; 175/372; 308/8.2; 308/76; 184/6.22
[51] Int. Cl.² ............................................. E21B 7/00
[58] Field of Search ....... 175/17, 39, 227, 228, 229, 175/337, 370, 65, 92, 359, 371, 372, 331; 308/8.2, 76, 77; 184/6.22

[56] References Cited
UNITED STATES PATENTS

| | | | |
|---|---|---|---|
| 1,870,696 | 8/1932 | Taylor | 175/17 |
| 2,356,578 | 8/1944 | Galtney | 308/76 |
| 2,861,780 | 11/1958 | Butler | 175/17 |
| 3,062,302 | 11/1962 | Toth et al. | 175/39 |
| 3,163,695 | 12/1964 | Blumberger | 308/77 |
| 3,650,337 | 3/1972 | Andrews et al. | 175/17 |
| 3,706,483 | 12/1972 | Irwin | 308/77 |
| 3,719,241 | 3/1973 | Bell | 175/228 |
| 3,735,825 | 5/1973 | Keller | 175/228 |

Primary Examiner—Ernest R. Purser
Assistant Examiner—Richard E. Favreau
Attorney, Agent, or Firm—Eddie E. Scott

[57] ABSTRACT

The present invention provides a rotary rock bit with a heat pipe for conducting heat from the bit's bearings. The rotary rock bit includes a bit body with a connection for connecting the bit body to a rotary drill string. At least one arm extends from the bit body and a rotatable cutter is mounted on said arm. Bearing means are located between the rotatable cutter and the arm for promoting rotation of the cutter. A heat pipe is positioned in the bit body and the heat pipe extends into the arm. The heat pipe includes an evaporator section located near the bearings and a condenser section located near the external surface of the bit.

6 Claims, 5 Drawing Figures

EARTH BORING BIT WITH MEANS FOR CONDUCTING HEAT FROM THE BIT'S BEARINGS

BACKGROUND OF THE INVENTION

The present invention relates to the art of earth boring and more particularly to a rotary rock bit with means for conducting heat from the bearings between the rock bit body and a rotatable cutter mounted on the rock bit body.

A rotary rock bit, in general, consists of a main bit body adapted to be connected to a rotary drill string. The bit includes at least one rotatable cutter mounted upon a bearing shaft extending from the main bit body. Bearing systems are povided between the rotatable cutter and the bearing shaft to promote rotation of the cutter and means are provided on the outer surface of the cutter for disintegrating the earth formations as the bit and cutter are rotated.

The operating life of the bearing systems of the rock bit are frequently governed by the temperature reached at the bearing systems during drilling. High temperatures may be encountered in the borehole during the drilling operations and when this high-temperature environment is coupled with the heat generated by the rotation of the rock bit, the resulting temperature may cumulate in damage to the bearings. The temperature of the borehole will rise as the borehole penetrates deeper into the earth and temperatures in the range of 250° F to 350° F at 10,000 feet depth may be expected with even higher temperatures at greater depths. Deep wells now being drilled are expected to result in environmental temperatures of up to 400° F and the drilling of steam wells results in environmental temperatures as high as 550° F. As the bit is rotated and the rotatable cutters engage the formations, a large amount of heat is generated, causing the temperature at the bearing systems to rise.

In prior art rotary rock bits, the heat generated at the bearings would blow outward through the steel or other materials of the rock bit body or the cutter to the cooling drilling fluid being circulated through the borehole. Dissipation of heat in this way is inefficient and bearing failure due to overheating is frequent. It will, therefore, be appreciated that a need clearly exists for a rotary rock bit with means for conducting heat from the rock bit's bearings.

DESCRIPTION OF PRIOR ART

To the best of Applicant's knowledge, a rotary rock bit with means for conducting heat from the bearings has not previously been known or constructed. A general description of a rotary rock bit is set out in U.S. Pat. No. 3,735,825 to W. S. Keller, patented May 29, 1973.

SUMMARY OF THE INVENTION

The present invention provides a rotary rock bit with means for conducting heat from the rock bit's bearings. The rotary rock bit includes a bit body with a cutter rotatably mounted on said bit body. Bearing means are provided between said cutter and said bit body for promoting rotation of said cutter. A heat pipe means extends from proximate the bearing means to a location on the bit body spaced from the bearing means for conducting heat from the bearing means. The above and other features of the present invention will become apparent from a consideration of the following detailed description of the invention when taken in conjunction with the drawings.

DETAILED DESCRIPTION OF THE INVENTION

Figure 1:
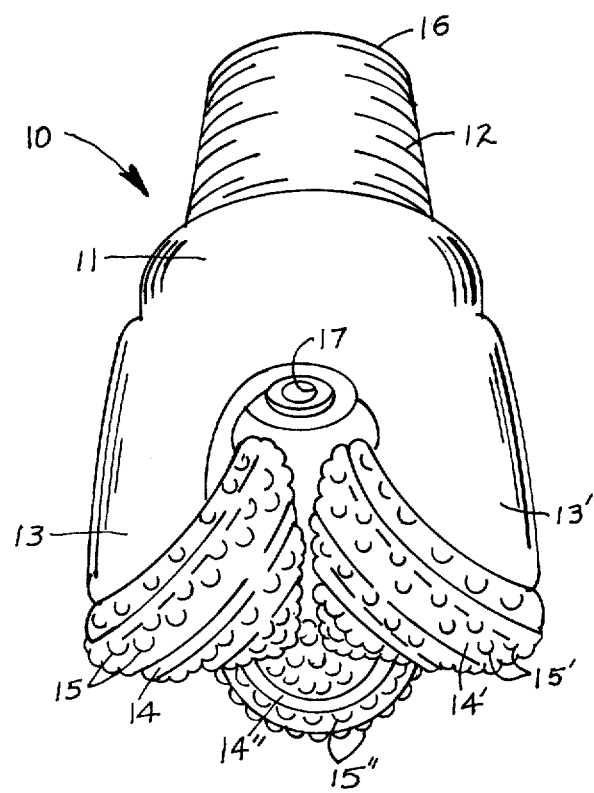
FIG. 1 illustrates a three-cone rotary rock bit.

Referring now to the drawings, and to FIG. 1 in particular, shown therein and generally designated by the reference number 10 is a three-cone sealed-bearing rotary rock bit. As illustrated, the bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms 13 and 13' being shown in FIG. 1. The lower end of each of the arms is provided with an extended journal portion and the details of this journal portion will be discussed subsequently. Three rotary cone cutters 14, 14', and 14" are rotatably positioned on the three journal portions of the arms. Each of the cutters 14, 14', 14" includes cutting structure 15, 15', 15" on its outer surface adapted to disintegrate the formations as the bit 10 is rotated and moved downward. The cutting structure 15, 15', 15" is shown in the form of tungsten carbide inserts. However, it is to be understood that other cutting structures, such as steel teeth, may be used as the cutting structure on the cone cutter.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, past the cutting structures 15, 15', 15" of the cone cutters 14, 14', 14". In use, the bit 10 is connected as the lower member of a rotary drill string (not shown) and lowered into a well bore until the cone cutters engage the bottom of the well bore. Upon engagement with the bottom of the well bore, the drill string is rotated, rotating bit 10 therewith. Drilling fluid is forced down through the interior passage of the rotary drill string and continues through the central passageway 16 of bit 10 passing through the nozzles, past the cutting structure of the cutters to the bottom of the well bore, thence upward in the annulus between the rotary drill string and the wall of the well bore carrying with it the cuttings and debris from the drilling operation.

Figure 2:
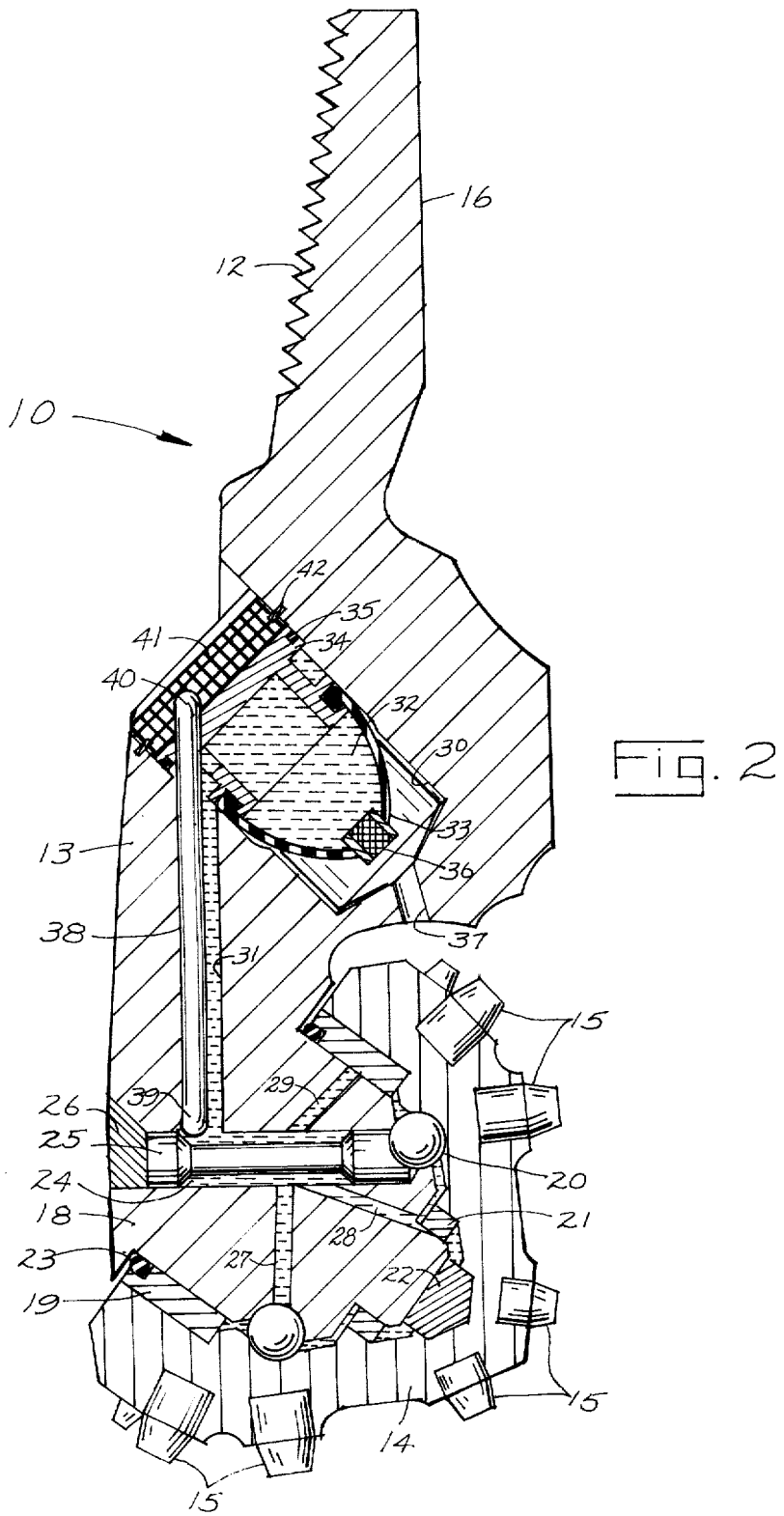
FIG. 2 is a sectional view of one arm of the rotary rock bit shown in FIG. 1.

Referring now to FIG. 2, a sectional view shown. one arm 13 of the bit 10 is shown. It is to be understood that the structure of the other arms 13' and 13" are identical to the arm 13. The cutter 14 is rotatably positioned on the journal portion of the arm 13 and adapted to disintegrate the earth formations as the bit 10 is rotated. The cutting structure 15 on the surface of cutter 14 contacts and disintegrates the formations in a manner that is well known in the art. The journal portion of arm 13 consists of a bearing pin 18 upon which the cutter 14 is mounted. A plurality of bearing systems are located in the bearing area between the cutter 14 and the bearing pin 18. The bearing systems in the bearing area include an outer friction bearing 19, a series of ball bearings 20, an inner friction bearing 21, and a thrust button 22. An O-ring seal 23 is positioned between the cutter 14 and the bearing pin 18. This seal retains lubricant in the bearing area around the bearing systems and prevents any materials in the well bore from entering the bearing area. The O-ring seal prevents fluid flow in either direction.

A passageway 24 is provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area. Additional passageways 27, 28, and 29 extend from passageway 24 to the bearing area to insure a sufficient supply of lubricant to bearings 19, 20, 21, and 22.

A bore 30 extends into the arm 13 from the surface of the bit body. A passage 31 extends from the bore 30 to the passageway 24. A lubricant reservoir 32 is located in the bore 30. The lubricant reservoir 32 is located between a flexible diaphragm 33 and a metal canister 24. An O-ring seal 35 prevents borehole fluid from by-passing the upper portion of the canister 34 and lubricant within the lubricant reservoir 32 from escaping into the borehole. The flexible diaphragm 33 prevents lubricant in the lubricant reservoir 32 from escaping into the bore 30 and fluid in the borehole and bore 30 from entering the lubricant reservoir 32. Lubricant within the lubricant reservoir 32 is channeled into the passage 31 and is directed to the bearings. A free-breathing porous filter plug 36 extends through the flexible diaphragm 33. The free-breathing porous filter plug 36 provides fluid communication between lubricant in the lubricant reservoir 32 and fluid from the borehole that has entered the bore 30 through passageway 37.

A heat pipe 38 fits within the passage 31 extending from the vicinity of the bearing systems 19, 20, 21, and 22 to a location proximate the outer surface of the bit 10. The heat pipe 38 fills only a portion of the passage 31, thereby allowing lubricant to be transmitted from the lubricant reservoir 32 to the bearing systems 19, 20, 21, and 22. The lower end 39 or evaporator section of the heat pipe 38 is located in the passageway 24 in a position to receive heat from the bearing systems 19, 20, 21, and 22. The upper end 40 or condenser section of the heat pipe 38 extends into a porous metal plug 41. The porous metal plug 41 is exposed to the cooling drilling fluid circulating through the borehole and allows heat to be dissipated to the cooling drilling fluid. The porous metal plug 41 abuts against the metal canister 34 and a snap ring 42 secures the porous metal plug 41, metal canister 34, lubricant reservoir 32, flexible diaphragm and porous filter plug 36 in place in the bore 30.

Figure 3:
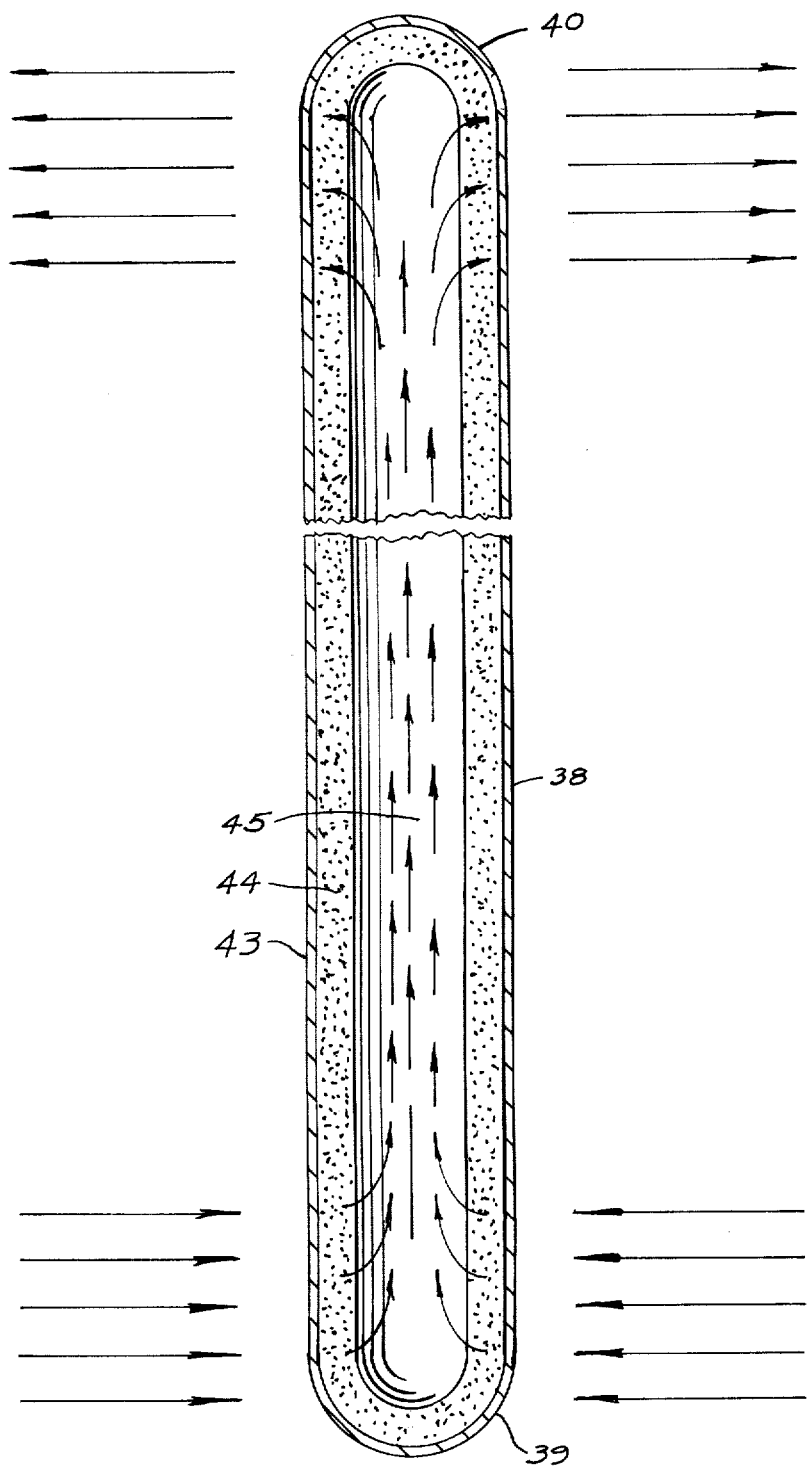
FIG. 3 is an enlarged sectional view of an element of the bit shown in FIGS. 1 and 2.

Referring now to FIG. 3, an enlarged sectional view of the heat pipe 38 is shown. The heat pipe 38 consists of an outer metal shell 43. The metal shell 43 provides a gas-tight container which has been evacuated of all non-condensable gases. The inside of the shell 43 is lined with a capillary wick structure 44. The inner walls of the wick structure 44 form a cylindrical passageway 45. The heat pipe 38 contains a small amount of vaporizable fluid. The heat pipe 38 employs a boiling-condensing cycle and the capillary wick 44 pumps condensate to the lower end 39 or evaporator section of the heat pipe. Heat from the bearing systems 19, 20, 21, and 22 is introduced to the heat pipe at the lower end 39 or evaporator section of the heat pipe 38 causing the liquid in the capillary wick 44 to boil into a gaseous state. The gas is carried to the upper end 40 or condenser section of the heat pipe 38 wherein it condenses releasing the heat to the porous metal plug 41 and the cooling drilling fluid circulating through the borehole. The heat pipe 38 dissipates a substantially greater amount of heat from the bearing systems to the borehole fluid than is dissipated by the elements of conventional rotary rock bits. The heat pipe 38 utilizes the principle of transporting the heat as latent heat of vaporization.

The structural details of a rotary rock bit constructed in accordance with the present invention having been described, the operation of the bit will now be considered. The bit 10 is connected to the lower member of a rotary drill string and lowered into a well bore until the cutters 14, 14', 14'' contact the earth formation at the bottom of the borehole. The bit 10 is rotated and the cutters 14, 14', 14'' and cutting structures 15, 15', 15'' contact and disintegrate the formations thereby extending the borehole deeper into the earth. The deeper the bit penetrates into the earth, the higher the temperatures become. The three heat pipes in the arms conduct the heat from the bearings. For example, heat in the bearing area is carried from the lower end 39 of the heat pipe 38 to the upper end 40 of the heat pipe 38 wherein the heat is dissipated to the drilling fluid circulating through the borehole. The porous metal plug 41 assists in dissipating the heat from the upper end 40 of the heat pipe 38. The lifetime of the bearings is extended and the bit can operate for a longer period of time resulting in a greater length of borehole being drilled.

Figure 4:
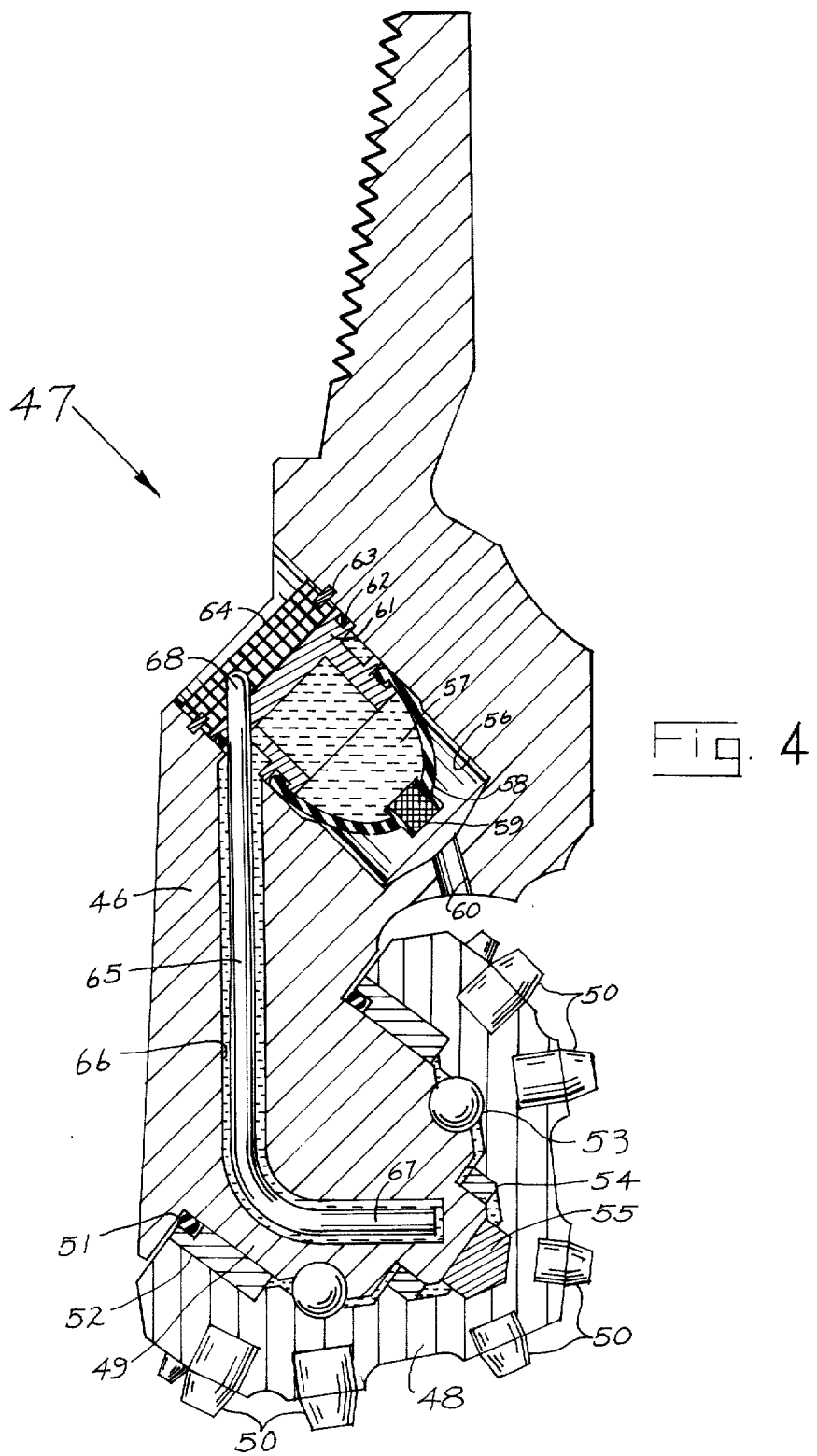
FIG. 4 illustrates a second embodiment of the present invention.

Referring now to FIG. 4, a sectional view of one arm 46 of a rotary rock bit 47 is shown. It is to be understood that the structure of the other arms of the rotary rock bit 47 are identical to the arm 46. A cutter 48 is rotatably positioned on the journal portion of the arm 46 and adapted to disintegrate the earth formations as the bit 47 is rotated. The cutting structure 50 on the surface of cutter 48 contacts and disintegrates the formations in a manner that is well known in the art. The cutting structure 50 is shown in the form of tungsten carbide inserts. However, it is to be understood that other types of cutting structure could be utilized. The journal portion of the arm 46 consists of a bearing pin 49 upon which the cutter 48 is mounted. A plurality of bearing systems are located in the bearing area between the cutter 48 and the bearing pin 49. The bearing systems in the bearing area include outer friction bearing 52, a series of ball bearings 53, an inner friction bearing 54, and a thrust button 55. An O-ring seal 51 is positioned between the cutter 48 and the bearing pin 49. This seal retains lubricant in the bearing area around the bearing systems and prevents any material in the well bore from entering the bearing area. The O-ring seal prevents fluid flow in either direction.

A bore 56 extends into the arm 46 from the surface of the bit 47. A bore 66 extends from the bore 56 to a position proximate the bearing 52, 53, 54, and 55. A lubricant reservoir 57 is located in the bore 56. The lubricant reservoir 57 is located between a flexible diaphragm 58 and a metal canister 61. An O-ring seal 62 prevents borehole fluids from by-passing the upper portion of the canister 61 and lubricant within the lubricant reservoir 57 from escaping into the borehole. The flexible diaphragm 58 prevents lubricant in the lubricant reservoir 57 from escaping in to the bore 56 and fluid in the borehole and bore 56 from entering the lubricant reservoir 57. A free-breathing porous filter plug 59 extends through the flexible diaphragm 58. The free-breathing porous filter plug 59 provides fluid communication between lubricant in the lubricant reservoir 57 and fluid from the borehole that has entered the bore 56 through passageway 60.

A heat pipe 65 fits within the bore 66 extending from the vicinity of the bearing systems 52, 53, 54, and 55 to a location proximate the outer surface of the bit 47. The lower end 67 or evaporator section of the heat pipe 65 is located in the bore 66 in a position to receive heat from the bearing systems 52, 53, 54, and 55. The upper end 68 or condenser section of the heat pipe 65 extends into a porous metal plug 64. The porous metal plug 64 is exposed to the cooling drilling fluid circulating through the borehole and allows heat to be dissipated to the cooling drilling fluid. The porous metal plug 64 abuts against the metal canister 61 and a snap ring 63 secures the porous metal plug 64, metal canister 61, lubricant reservoir 57, flexible diaphragm 58 and porous filter plug 59 in place in the bore 56. The heat pipe 65 takes up only a portion of the bore 66 allowing lubricant to be transmitted to the bearings through auxiliary passage (not shown).

The structural details of a rotary rock bit 47 constructed in accordance with the present invention having been described, the operation of the bit 47 will now be considered. The bit 47 is connected to the lower member of a rotary drill string and lowered into a well bore until the cutters contact the earth formation at the bottom of the borehole. The bit is rotated and the cutters and cutting structure contact and disintegrate the formation thereby extending the borehole deeper into the earth. The deeper the bit penetrates into the earth, the higher the temperatures become. The three heat pipes in the arms conduct the heat from the bearings. For example, heat in the bearing area is carried from the lower end 67 of the heat pipe 65 to the upper end 68 of the heat pipe 66 wherein the heat is dissipated to the drilling fluid circulating through the borehole. The porous metal plug 64 assists in dissipating the heat from the upper end 68 of the heat pipe 66. The lifetime of the bearings is extended and the bit can operate for a longer period of time resulting in a greater length of borehole being drilled.

Figure 5:
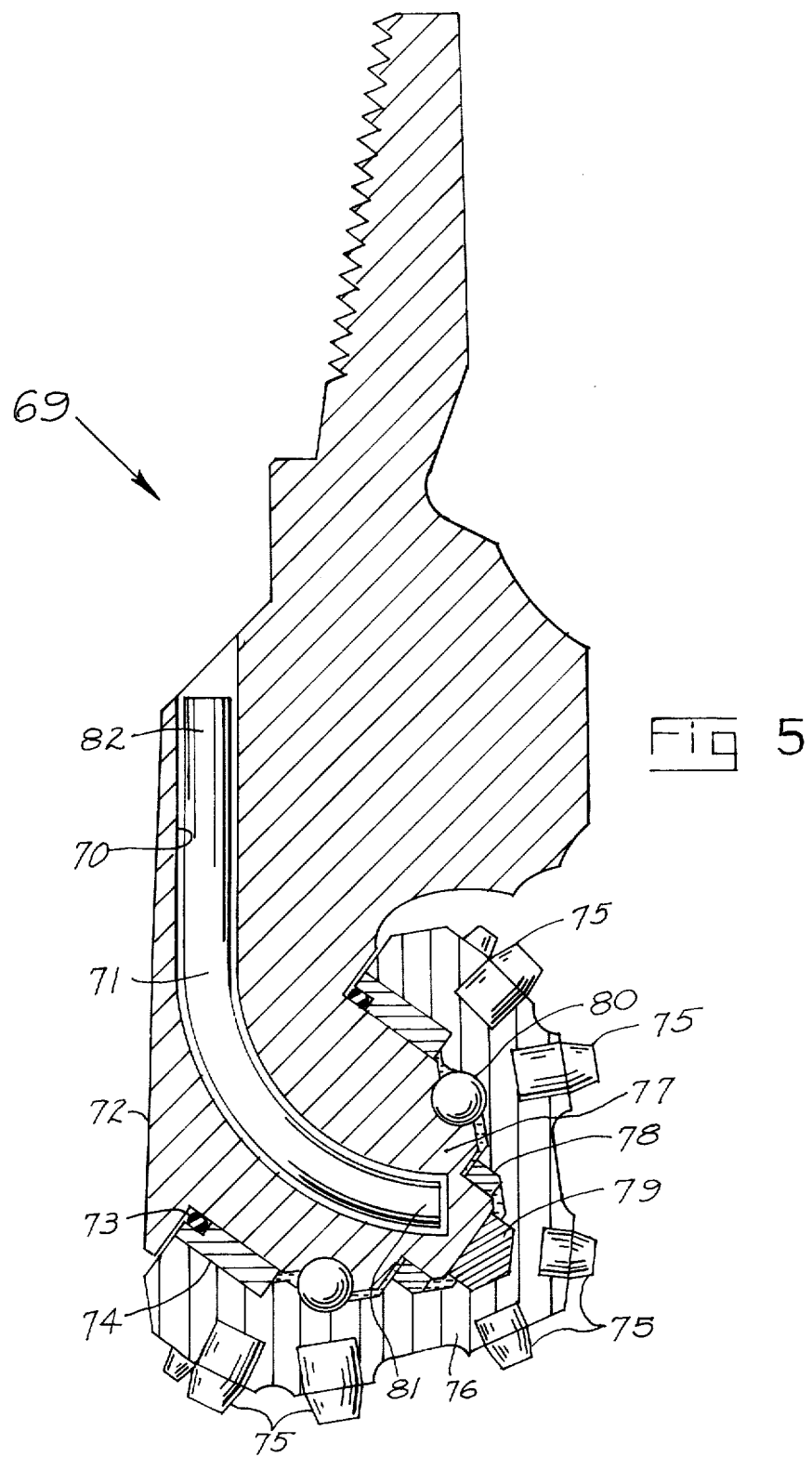
FIG. 5 illustrates another embodiment of the present invention.

Referring now to FIG. 5, a sectional view of one arm 72 of a rotary rock bit 69 is shown. It is to be understood that the other arms of the rotary rock bit 69 are identical to the arm 72. A cutter 76 is rotatably positioned on the journal portion of the arm 72 and adapted to disintegrate the earth formations as the bit 69 is rotated. The cutting structure 75 on the surface of cutter 76 contacts and disintegrates the earth formations in a manner that is well known in the art. The cutting structure 75 is shown in the form of tungsten carbide inserts; however, it is to be understood that other types of cutting structure could be utilized. The journal portion of the arm 72 consists of a bearing pin 77 upon which the cutter 76 is mounted. A plurality of bearing systems are located in the bearing area between the cutter 76 and the bearing pin 77. The bearing system in the bearing area include outer friction bearing 74, a series of ball bearings 80, an inner friction bearing 78, and a thrust button 79. An O-ring seal 73 is positioned between the cutter 76 and the bearing pin 77. This seal retains lubricant in the bearing area around the bearing systems and prevents any material in the well bore from entering the bearing area. The O-ring seal prevents fluid flow in either direction.

A bore 70 extends into arm 72 from the surface of the bit 69. A heat pipe 71 fits within the bore 70. The heat pipe 71 extends from the vicinity of the bearing systems 74, 78, 79, and 80 to a location proximate the outer surface of bit 69. The lower end 81, or evaporator section, of the heat pipe 71 is located in the bore 70 in a position to receive heat from the bearing systems 74, 78, 79, and 80. The upper end 82, or condenser section, of the heat pipe 71 is positioned proximate the outer surface of the bit 69. When the heat pipe 71 is positioned in the bore 70, it becomes slightly bent in order to follow the contour of the curve of the bore 70. This bend in the heat pipe 71 causes the heat pipe to be securely locked in position in the bit 69.

The structural details of a rotary rock bit 69 constructed in accordance with the present invention having been described, the operation of the bit 69 will now be considered. The bit 69 is connected to the lower member of a rotary drill string and lowered into a well bore until the cutters contact the earth formation at the bottom of the borehole. The bit is rotated and the cutters and cutting structure contact and disintegrate the formation thereby extending the borehole deeper into the earth. The deeper the bit 69 penetrates into the earth, the higher the temperatures become. The three heat pipes in the arms conduct the heat from the bearings. For example, heat in the bearing area is carried from the lower end 81 of the heat pipe 71 to the upper end 82 of the heat pipe 71 wherein the heat is dissipated to the drilling fluid circulating through the borehole. The lifetime of the bearings is extended and the bit can operate for a longer period of time resulting in a greater length of borehole being drilled.

The embodiments of the invention in which an exclusive properly or privilege is claimed are defined as follows:

1. An earth boring bit for drilling under conditions that include heat being encountered in the bit during the drilling operation, comprising:
   a bit body;
   a cutter rotatably mounted on said bit body;
   bearing means between said cutter and said bit body; and
   heat pipe means extending from proximate said bearing means to a location on said bit body spaced from said bearing means for conducting heat from said bearing means, said heat pipe means comprising a gas tight container, a capillary wick within said container and a vaporizable fluid within said container.

2. The earth boring bit of claim 1 including a heat dissipating element positioned in a bore in said bit body proximate said heat pipe means.

3. A sealed bearing rotary rock bit adapted to operate under conditions wherein heat is encountered at the bit bearings, comprising:
   a bit body;

a connection for connecting the bit body to a rotary drill string;

at least one arm extending from said bit body, said arm terminating in a bearing pin;

a rotatable cone cutter rotatably mounted upon said bearing pin;

bearing means between said rotatable cone cutter and said bearing pin for promoting rotation of said rotatable cone cutter;

a lubricant reservoir containing lubricant in said arms;

means for conducting lubricant from said lubricant reservoir to said bearing means;

seal means for providing a closure between said rotatable cone cutter and said bearing pin thereby retaining the lubricant inside of the bit and preventing fluid outside of the bit from entering the bit; and a heat pipe in said bit body extending into said bearing pin, said heat pipe comprising a gas tight container, a capillary wick within said container and a vaporizable fluid within said container and having an evaporator section located near said bearing means and a condenser section spaced from said bearing means.

4. The earth boring bit of claim 3 including a heat dissipating element positioned in a bore in said bit body proximate the condenser section of said heat pipe.

5. An earth boring bit for drilling under conditions that include heat being encountered in the bit during the drilling operation, comprising:

a main body;

three individual arms extending from said bit body, each of said arms including a bearing pin;

a rotatable cone cutter mounted upon each of said bearing pins;

bearing means between each of said cone cutters and said bearing pins;

a seal between each of the cone cutters and said bearing pins;

a lubricant reservoir in each of said arms;

a lubricant passage in each of said arms extending from said lubricant reservoirs to said bearing means; and heat pipe means in each of said arms extending from proximate said bearing means to locations on said bit body spaced from said bearing means for conducting heat from said bearing means, said heat pipe means comprising a gas tight container, a capillary wick within said container and a vaporizable fluid within said container.

6. In a sealed bearing rotary rock bit including a bit body, a cutter rotatably mounted on said bit body and bearing means between said cutter and said bit body for drilling under conditions that include heat being encountered in the bit during the drilling operation, the improvement comprising:

a bore in said bit body, said bore extending proximate said bearing means; and a heat pipe in said bore in bit body, said heat pipe comprising a gas tight container, a capillary wick within said container and a vaporizable fluid within said container with said heat pipe having an evaporator section located proximate said bearing means and a condenser section spaced from said bearing means.

* * * * *

UNITED STATES PATENT OFFICE
CERTIFICATE OF CORRECTION

Patent No. 3,935,911     Dated February 3, 1976

Inventor(s) Robert William McQueen

It is certified that error appears in the above-identified patent and that said Letters Patent are hereby corrected as shown below:

Column 7, line 32, after "main" insert --bit--.

Signed and Sealed this thirteenth Day of April 1976

[SEAL]

Attest:

RUTH C. MASON
*Attesting Officer*

C. MARSHALL DANN
*Commissioner of Patents and Trademarks*